Feb. 23, 1932.    J. L. ALLER ET AL    1,846,075
FILM DEVELOPING AND DRYING APPARATUS
Filed Dec. 15, 1925    9 Sheets-Sheet 1
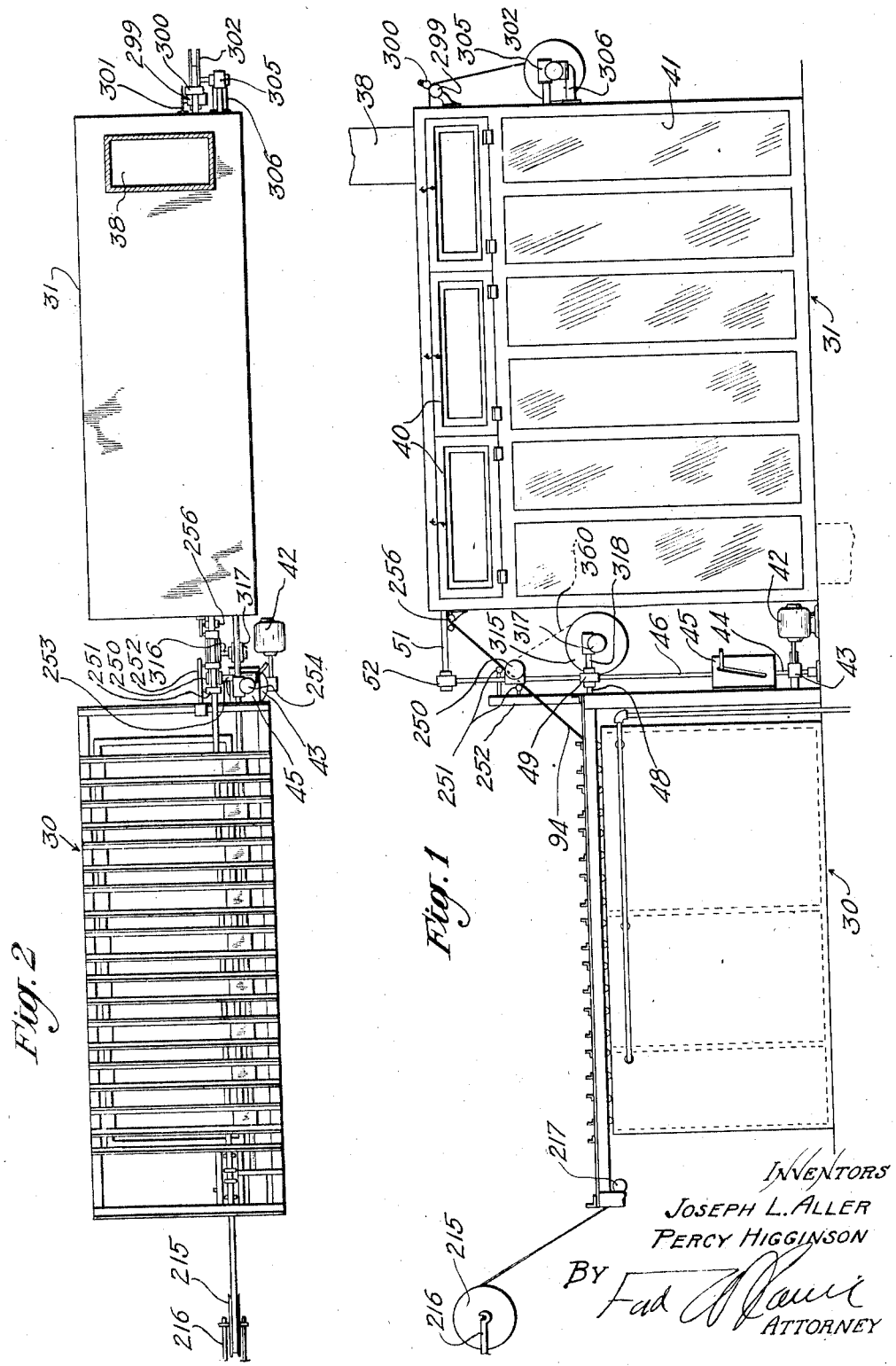
INVENTORS
JOSEPH L. ALLER
PERCY HIGGINSON
BY
ATTORNEY Feb. 23, 1932.  J. L. ALLER ET AL  1,846,075
FILM DEVELOPING AND DRYING APPARATUS
Filed Dec. 15, 1925   9 Sheets-Sheet 2
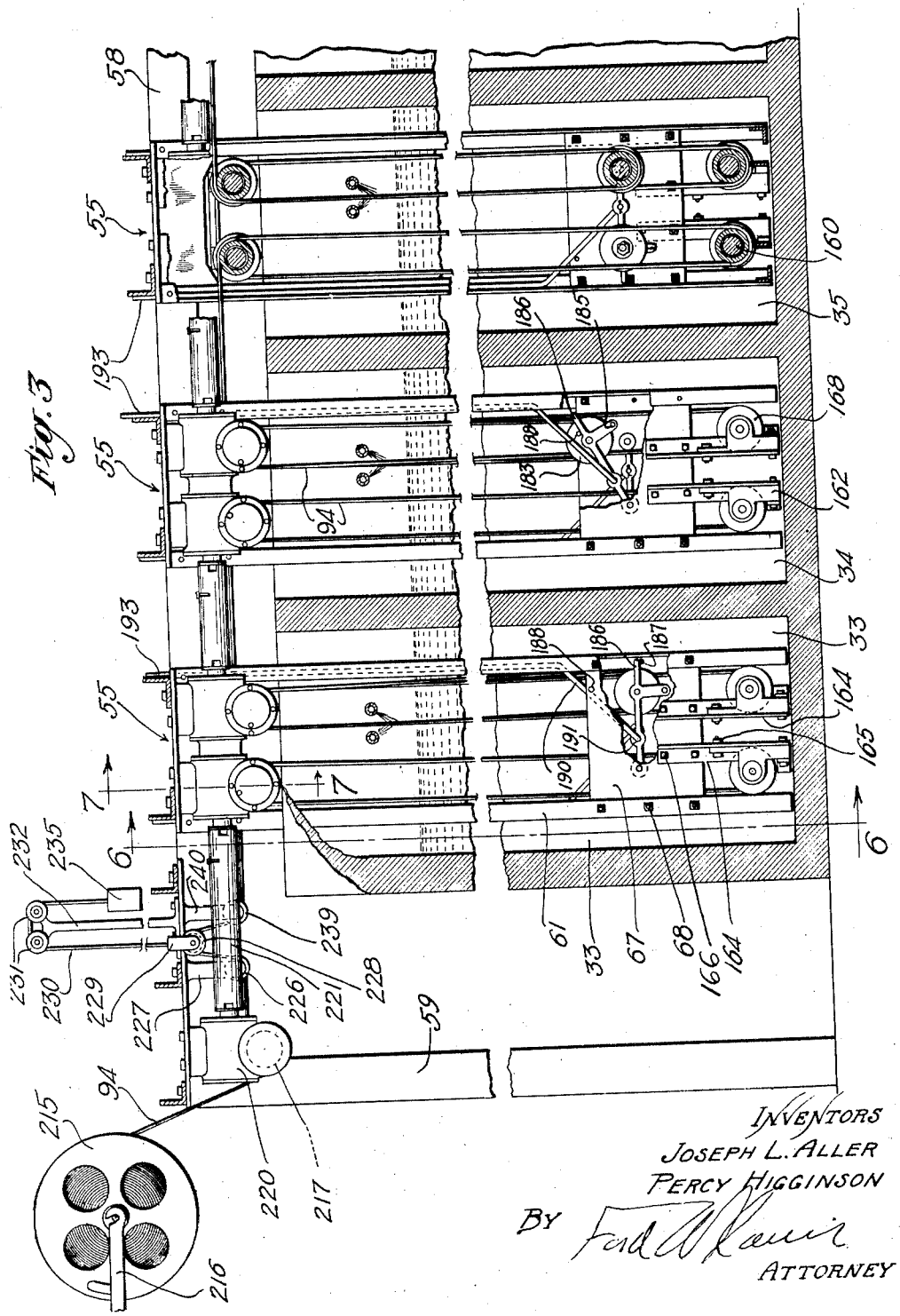
INVENTORS
JOSEPH L. ALLER
PERCY HIGGINSON
BY
ATTORNEY

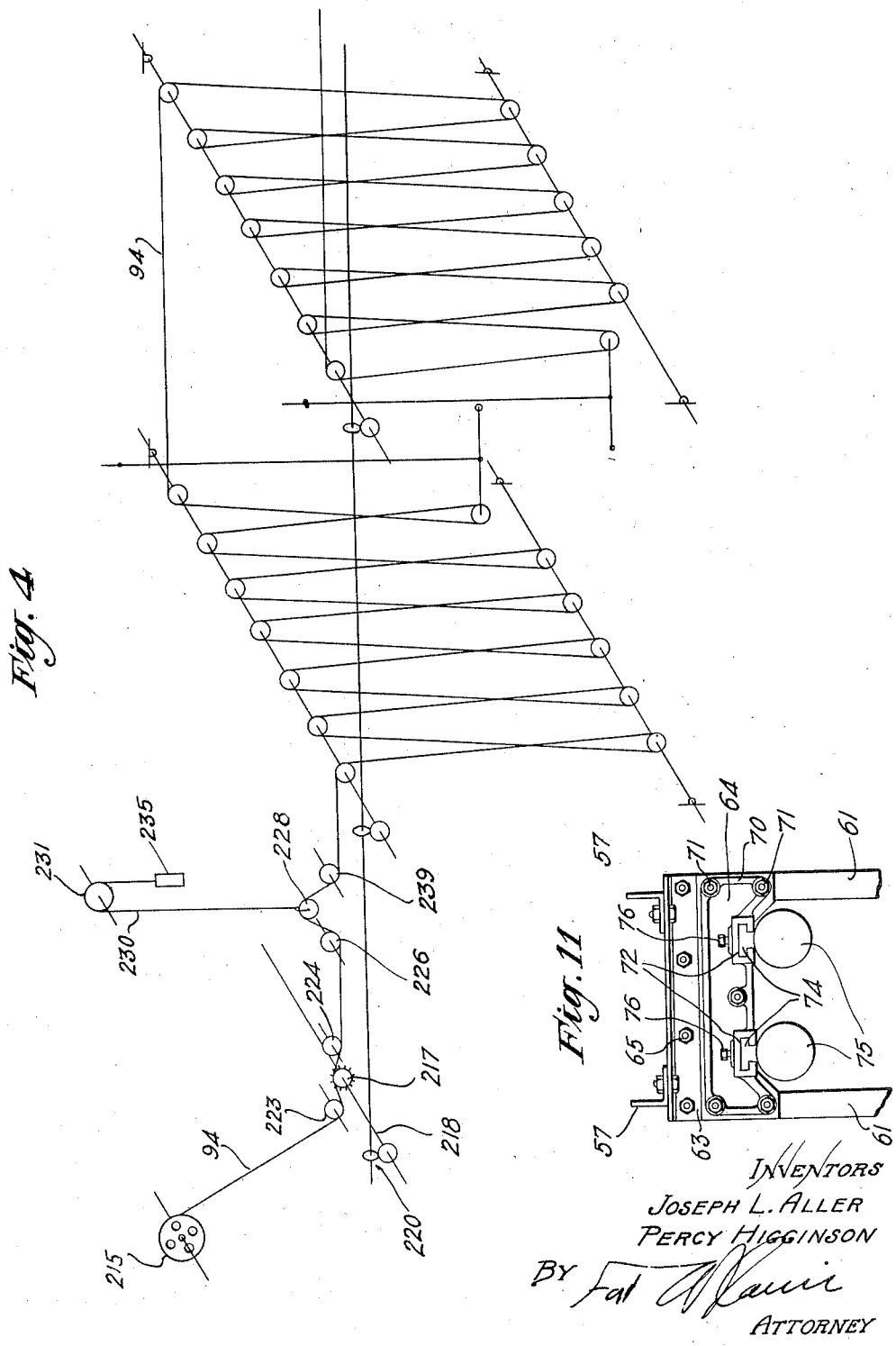

Feb. 23, 1932.   J. L. ALLER ET AL   1,846,075
FILM DEVELOPING AND DRYING APPARATUS
Filed Dec. 15, 1925   9 Sheets-Sheet 4
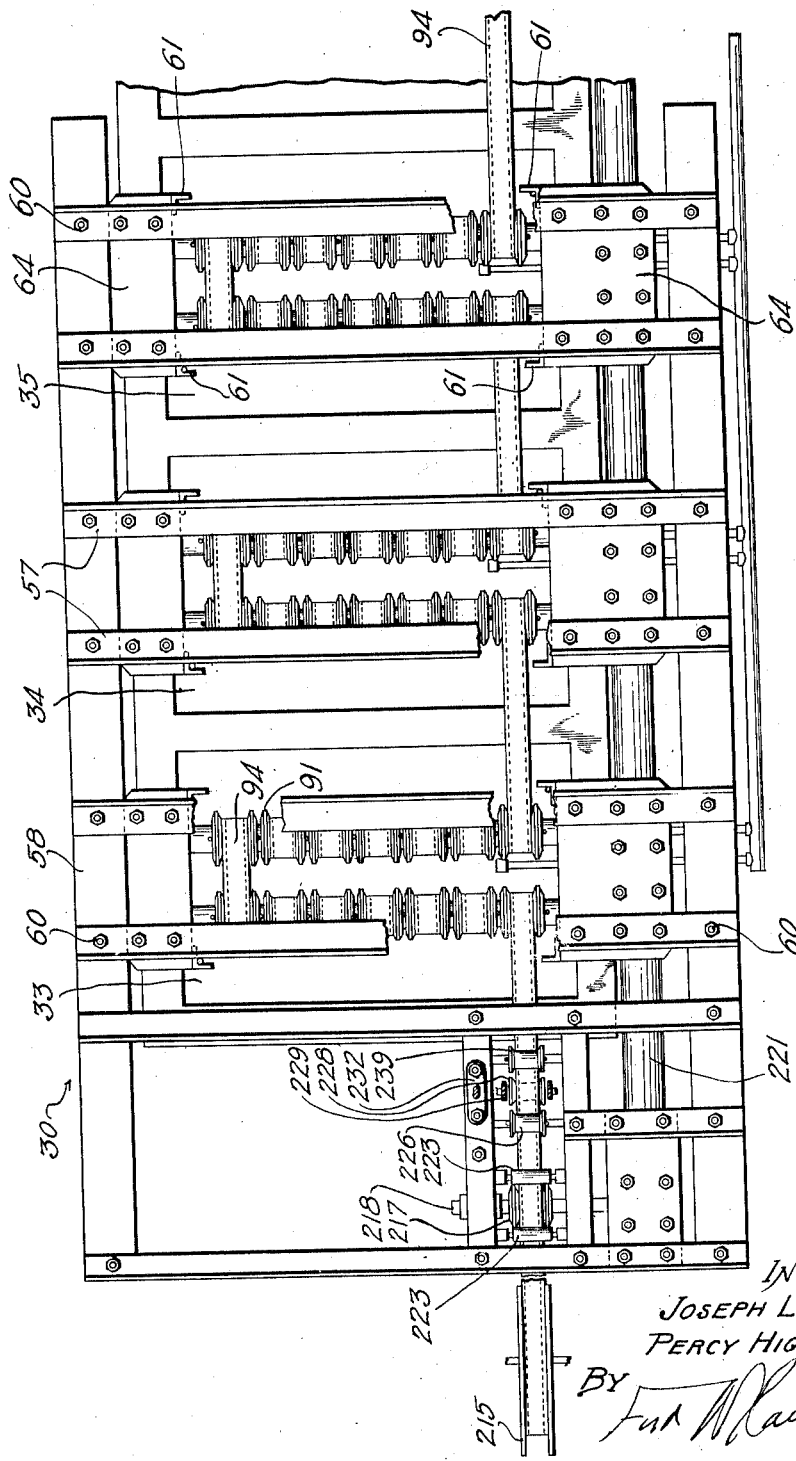

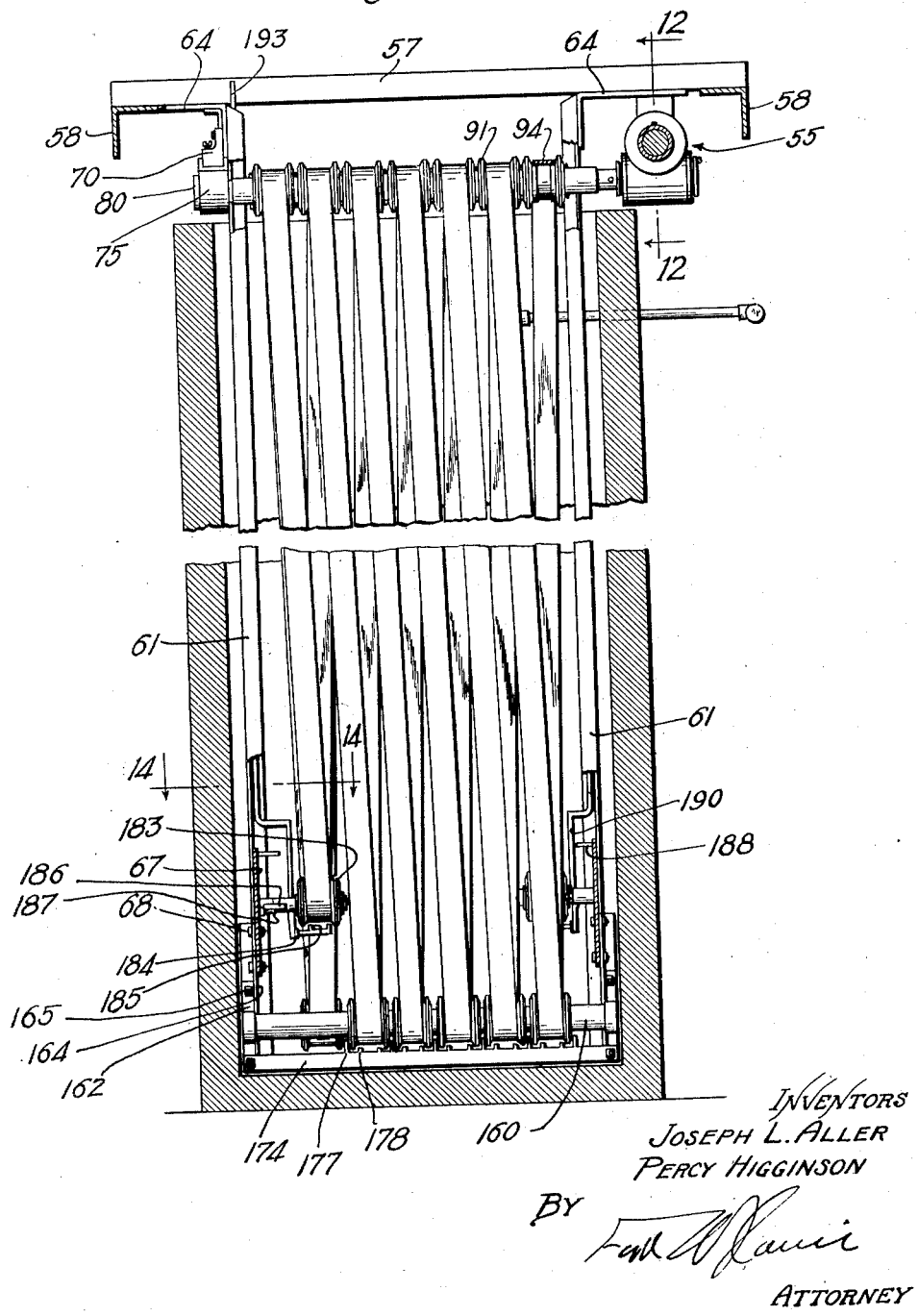

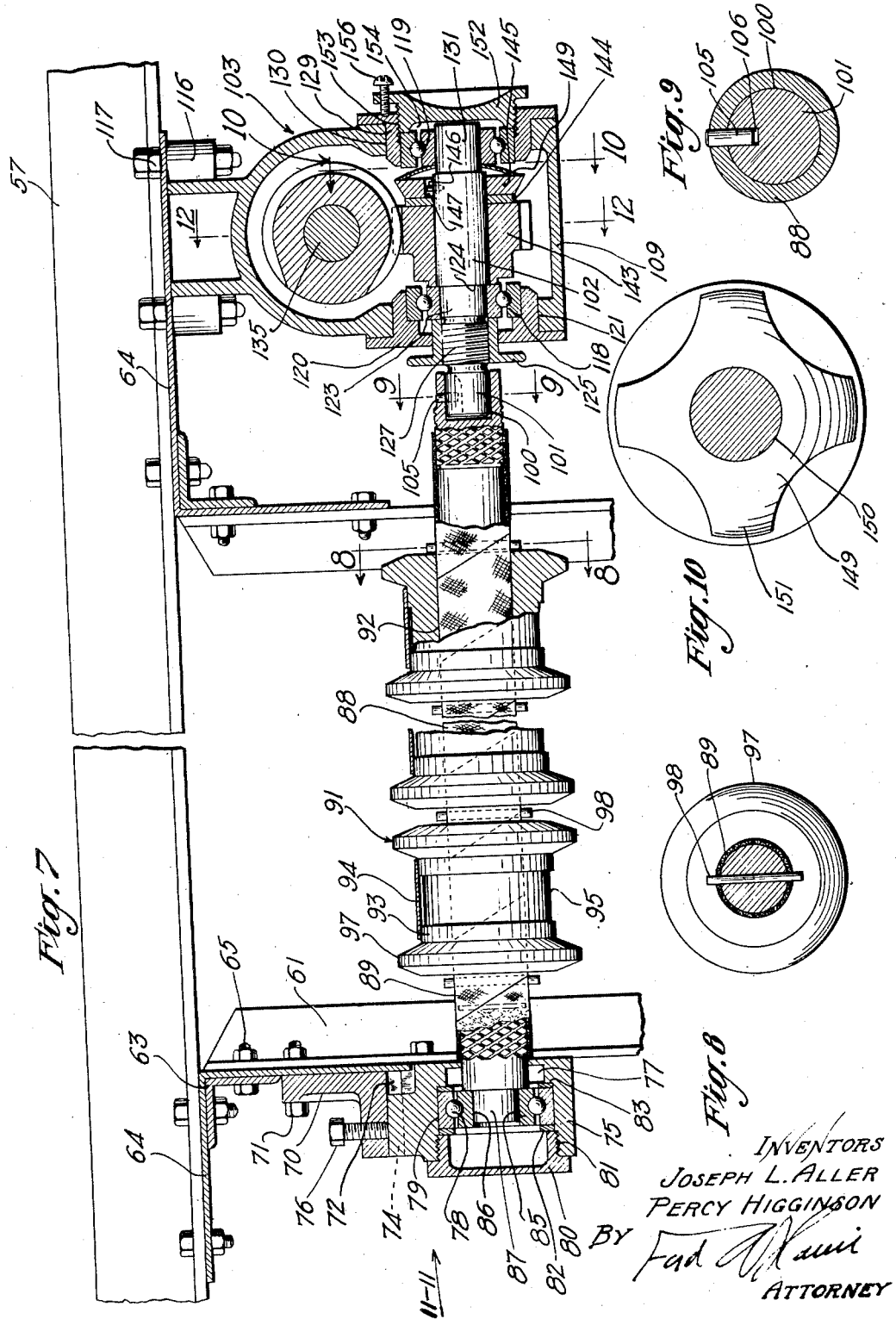

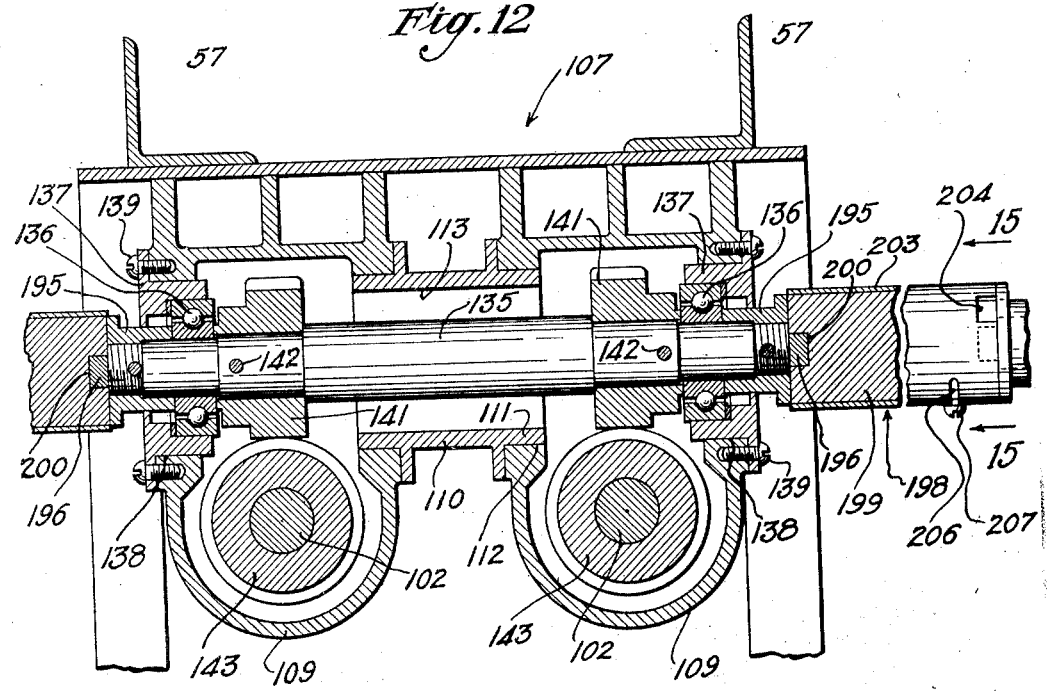
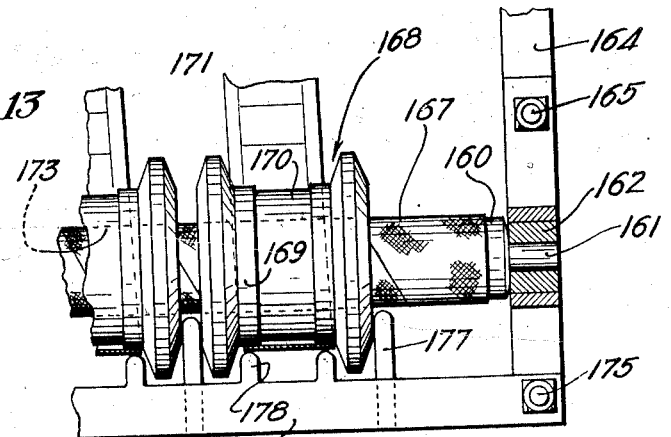
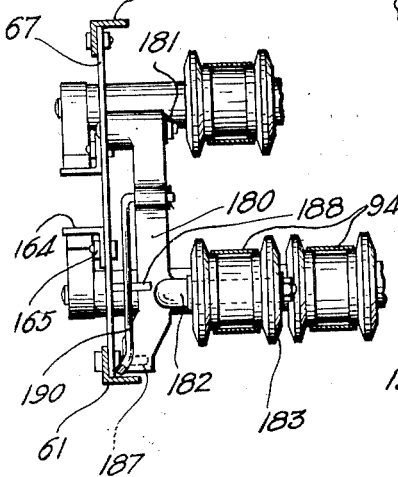

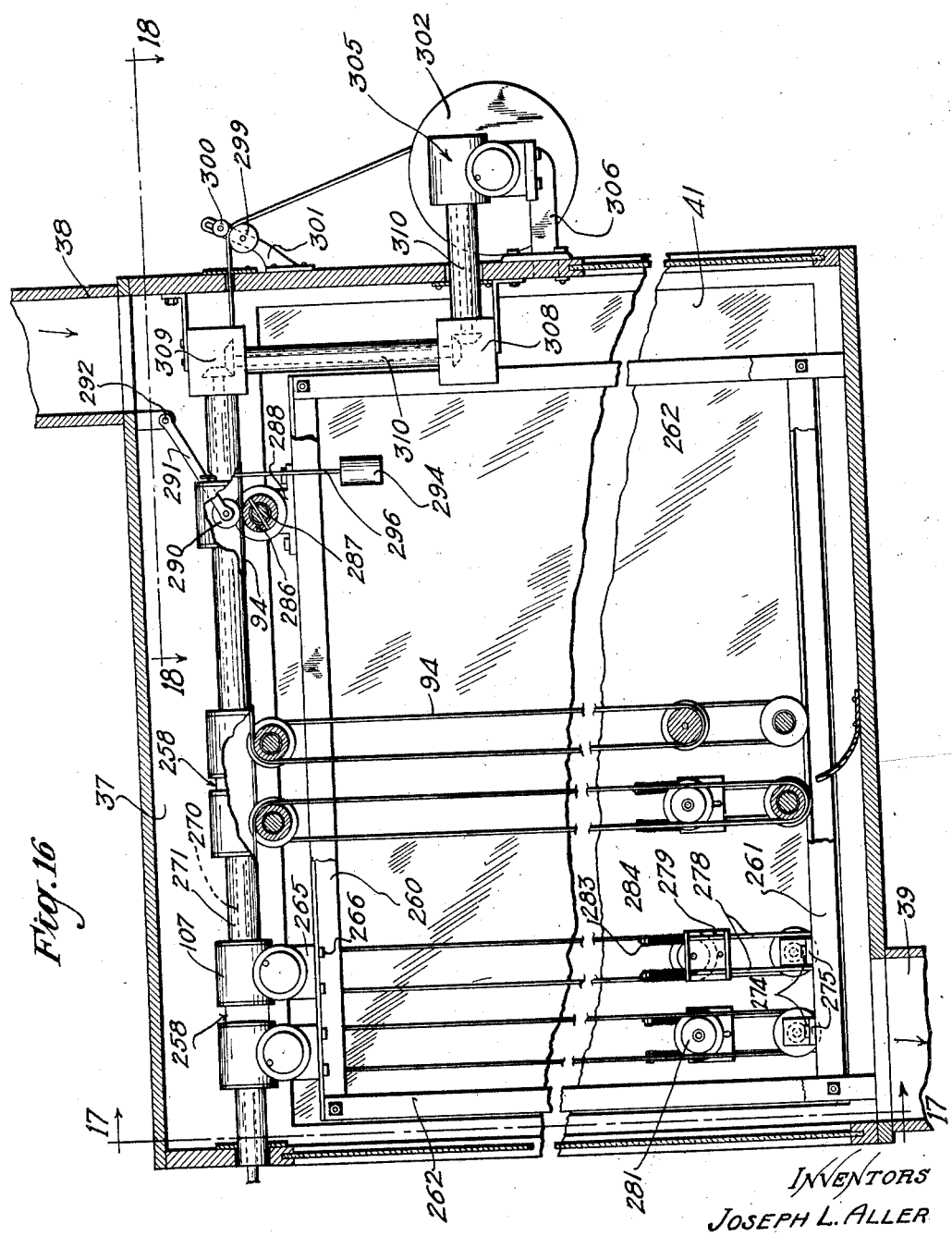

Feb. 23, 1932.    J. L. ALLER ET AL    1,846,075
FILM DEVELOPING AND DRYING APPARATUS
Filed Dec. 15, 1925    9 Sheets-Sheet 9
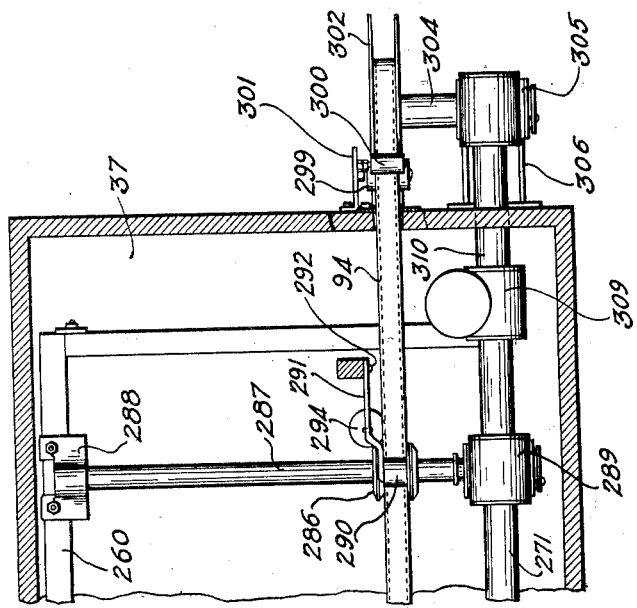
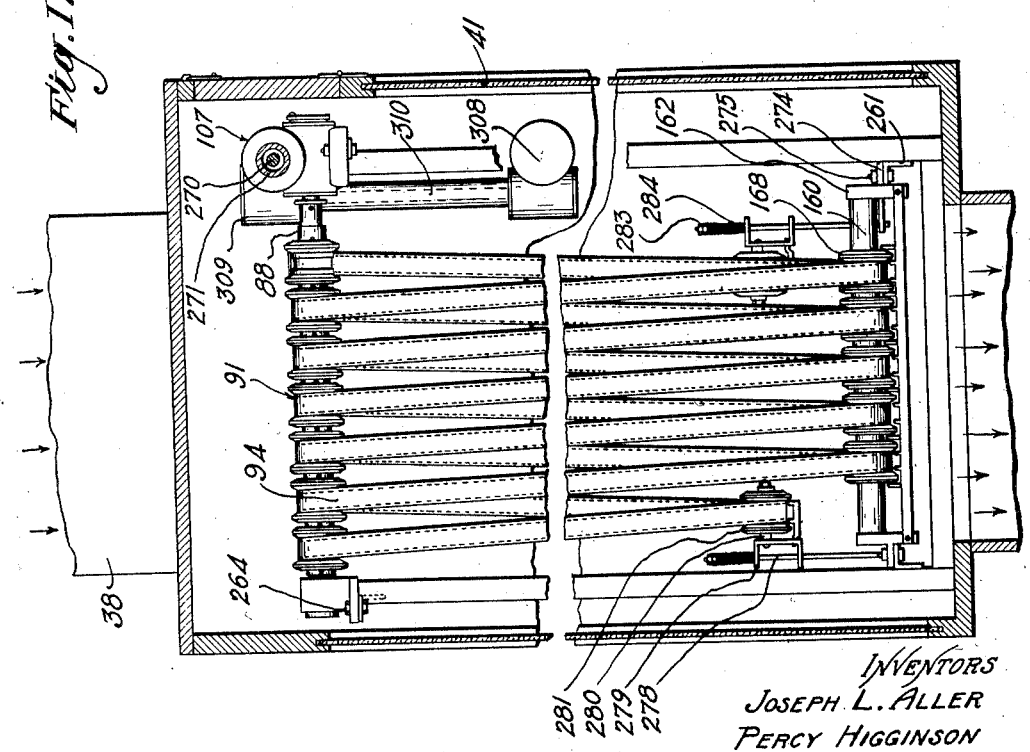
INVENTORS
JOSEPH L. ALLER
PERCY HIGGINSON
ATTORNEY Patented Feb. 23, 1932

1,846,075

UNITED STATES PATENT OFFICE

JOSEPH L. ALLER AND PERCY HIGGINSON, OF LOS ANGELES, CALIFORNIA, ASSIGNORS, BY MESNE ASSIGNMENTS, TO CINEMA PATENTS COMPANY, INC., OF NEW YORK, N. Y., A CORPORATION OF NEW YORK

FILM DEVELOPING AND DRYING APPARATUS

Application filed December 15, 1925. Serial No. 75,550.

This invention relates to the art of developing photographic film, and it is embodied in an automatic film developing machine especially suitable for developing motion picture film.

In this art both positive and negative film, after their exposures, are subjected to series of treatments which prepare them for the cutting room. The exposed film generally passes through the following steps. The film is first developed by immersion in a developing solution; the images are fixed thereon by immersion in a fixative solution; it is then cleansed of all adherent solutions by immersion in a wash; the film may then be dyed and toned as desired; and it is then dried. The film thus treated is ready for the cutting room.

Motion picture films are carried through these series of treatments either manually or by automatic apparatus, and our invention relates to an automatic apparatus for developing motion picture film.

In such apparatus the film is passed through the various solution tanks or "wet box" and the drying compartments or "dry box", the wet box and dry box having series of upper and lower spools on which the film is wound. The film stretches while in the wet box and shrinks while in the dry box. The most urgent problem to combat in such an apparatus is that which results from the stretch and shrink of the film. If the film becomes too loose on the spools, there is a danger of it being tangled; and if it becomes too tight, there is a danger of it being broken.

It is an object of this invention to provide a film developing apparatus having automatic means for maintaining the tension of a film being treated at normal. "Normal tension" should be understood to be that tension at which there is a minimum of strain on the film but with no loosening which might result in tangling.

It is another object of this invention to provide a film developing apparatus having upper and lower spools over which the film is wound and clutch mechanism through which the spools are driven, the clutch mechanism being adapted to operate in a manner to compensate for any stretch or shrink of the film and thus maintain the film at normal tension.

It is a further object of this invention to provide a film developing apparatus in which the clutch mechanism may be adjusted while the apparatus is in operation.

It is a still further object of this invention to provide a film developing apparatus of this character in which the clutch mechanism operates with a slight slippage under normal condition.

It is another object of this invention to provide a film developing apparatus having upper and lower spools on which a film is wound, upper and lower shafts on which the upper and lower spools respectively are loosely carried, and clutch mechanism through which one of these shafts is driven.

It is another object of this invention to provide a film developing apparatus having a compensating spool which is free to move in a manner to help compensate for stretch or shrink of the film.

It is another object of this invention to provide a film developing apparatus in which the compensating spool is connected with a teller which indicates the position of this compensating spool.

It is a still further object of this invention to provide a film developing apparatus having novel means for holding the film on the lower spools of the apparatus, should it become loose during, before or after the operation of the apparatus.

It is another object of this invention to provide a film developing apparatus having a special form of coupling for connecting different shafts of the apparatus together.

It sometimes occurs that trouble is encountered in the dry box while the film is still in the wet box. If the film is allowed to remain in the wet box, it will be over-developed and likely ruined; and it is desirable therefore to have facilities for taking the film from the wet box without passing it through the dry box until later.

It is therefore an object of this invention to provide a film developing apparatus having means for taking film directly from the wet box without passing it through the dry box.

It is another object of this invention to provide a film developing apparatus having a slack take-up device placed at the forward end of our invention between a feed reel and the first unit thereof in order to prevent any slack of the film at this point.

Other objects and advantages of this invention will be made evident hereinafter.

Referring to the drawings:

Fig. 1 is a diagrammatic elevational view of a complete apparatus.

Fig. 2 is a plan view of Fig. 1.

Fig. 3 is an elevational view partly sectioned of the forward part of the apparatus showing the feed means and a portion of the wet box.

Fig. 4 is a very diagrammatic perspective view showing the forward end of the apparatus and being for the purpose of clearly illustrating the manner in which the film is fed and wound over certain spools.

Fig. 5 is a plan view of the apparatus shown in Fig. 3.

Fig. 6 is a cross sectional view taken as indicated by the line 6—6 of Fig. 3.

Fig. 7 is an enlarged fragmentary sectional detail taken substantially as indicated by the line 7—7 of Fig. 3, showing the upper spools and clutch mechanism.

Fig. 8 is a section taken on the line 8—8 of Fig. 7.

Fig. 9 is a section taken on the line 9—9 of Fig. 7.

Fig. 10 is a section taken on the line 10—10 of Fig. 7.

Fig. 11 is a view taken as indicated by the arrow 11—11 of Fig. 7 showing supporting means for the bearing cages.

Fig. 12 is a longitudinal section through a clutch mechanism and is taken as indicated by lines 12—12 of Figs. 6 and 7.

Fig. 13 is an enlarged fragmentary detail of lower rollers.

Fig. 14 is a fragmentary view taken substantially as indicated by the line 14—14 of Fig. 6, this view showing a compensating spool.

Fig. 15 is a section taken on the line 15—15 of Fig. 12 and shows the construction of a novel coupling.

Fig. 16 is an elevational view, partially sectioned, of the dry box.

Fig. 17 is a cross section taken through the dry box substantially as indicated by the line 17—17 of Fig. 16.

Fig. 18 is a plan view in section taken substantially as indicated by the line 18—18 of Fig. 16.

Referring to Figs. 1 and 2, the apparatus consists broadly in a wet box 30 and a dry box 31, which include certain mechanisms which will be described hereinafter.

The wet box as shown clearly in Figs. 3, 5 and 6, is constructed to form a developing tank 33, a fixative solution tank 34, a wash tank 35, and if desired may provide suitable dyeing and toning solution tanks. The dry box 31, as shown in Figs. 16 and 17, provides one large compartment 37 having a hot air inlet 38 and a hot air outlet 39 which permit the passage of hot air through the compartment 37 for drying film after it has been passed through the wet box. The dry box is provided with suitable doors 40 and windows 41 so that the film may be properly threaded through the apparatus in the compartment 37 and so that it may be observed from the exterior when the machine is in operation.

The film handling mechanisms in both the wet box and the dry box are substantially the same, the main differences being in the manner in which they are attached in place. The mechanism in the wet box is formed so that it may be lifted from the various solution tanks, whereas the mechanism in the dry box is permanently secured in place. These mechanisms are driven by a drive motor 42 which is placed between the wet box 30 and the dry box 31, as shown in Figs. 1 and 2. The motor 42 operates a gear arrangement 43 which drives a shaft 44 of a quick-change gear box 45. A vertical shaft 46 extends upwardly from the quick-change gear box 45 which is drivably connected to a wet box drive shaft 48 by means of a gear arrangement 49 and is drivably connected to a dry box drive shaft 51 through a bevel gear arranged as indicated at 52.

As shown best in Figs. 3 to 14 inclusive, wet box film handling units 55 are extended into the solution tanks 33, 34 and 35. Each of these units 55 is identical in construction. Each unit consists of upper cross bars 57 which extend crosswise above the solution tanks and the ends thereof rest on longitudinal angle members 58 of the wet box 30, which members 58 are supported at each end and at intermediate points by posts 59. These cross bars 57 are secured to the longitudinal bars 58 by suitable bolts 60 when the units are in operating position. Vertical legs 61 extend downwardly from and are secured to the upper cross bars 57, which are two in number, by brackets 63 and plates 64 and bolts 65. There are four vertical legs 61 for each unit 55, which legs are spaced to form rectangles and are arranged in pairs. Side plates 67 are secured by bolts 68 to the pairs of legs 61 at positions slightly above the lower ends of these legs 61.

As shown in Fig. 7 and Fig. 11, a casting 70 is secured to the plate 64 at the left end of the unit 55 by bolts 71. As shown in Fig. 11, each of the castings 70 is provided with a pair of T slots 72, these T slots extending horizontally as shown. T formations 74 of bearing cages 75 are extended into the T slots 72 and are locked therein by lock screws 76.

The bearing cages 75 have opening 77 in which ball bearings 78 are secured, these bearings 78 being locked in portions 79 of the openings 77 by caps 80. The caps 80 are threaded into the openings 77 as indicated at 81 in Fig. 7, and secure the bearings between washers 82 and 83. Inner races 85 of the bearings 78 have central openings 86 in which reduced ends 87 of upper spool shafts 88 are pressed, there being two upper spool shafts for each unit 55.

The central parts of the upper shafts 88 are wrapped with a suitable friction tape 89 which drives the upper spools 91 thereon and provides sufficient friction to prevent the spools from rotating relative to the shaft under ordinary operating conditions. These upper spools 91 have openings 92 formed therethrough, through which the upper shafts 88 extend. The spools 91 have film engaging portions 93 which engage the edges of a film 94, central parts 95 of the spools 91 being reduced in size as shown. Flanges 97 are formed on the spools 91 at each side of the film engaging portions 93. The upper spools 91, as shown in Figs. 7 and 8, are held in proper relationship on the shafts 88 by diametrically extending pins 98. The right ends of the upper shafts 88 are provided with sockets 100 as shown in Fig. 7, into which a plug portion 101 of a driven shaft 102 of a clutch mechanism 103 is extended. As shown in Fig. 9, the shafts 88 are provided with key pins 105 which extend radially into the sockets 100, the inner ends thereof resting in T slots 106 formed in the plug portion 101. The engagement between the pins 105 and the walls of the T slots 106 provides driving engagement between the driven shaft 102 and the upper spool shaft 88. By loosening the set screws 76, the upper shafts and the upper spools, along with the bearings and cages, may be facilely removed from place.

Each of the units 55 is provided with a clutch mechanism unit 107, of which the clutch mechanisms 103 form a part. The clutch mechanism units 107, as shown clearly in Figs. 7 and 12, each comprises a pair of housings 109 which are connected together by a connector 110, the ends 111 of which extend into openings 112 formed in the adjacent sides of the housings 109. The connector 110 of each unit has a central opening 113 formed therethrough. The upper parts of the housings 109 are provided with lugs 116 and bolts 117 extend therethrough for securing the units 107 to the right plate 64 (Fig. 7) of each of the film handling units 55. The shafts 102 extend into the housings 109 and are supported by ball bearings 118 and 119. The bearings 118 are carried in bushings 120 which are inserted into openings 121 of the housings 109. The bearings 118 are carried on portions 123 of the driven shafts 102 and are held against shoulders 124 by collars 125 which are threaded on portions 127 of the shafts 102. The bearings 119 are carried in bushings 129 which are inserted into openings 130 of the housings 109, these bearings 119 resting on reduced end portions 131 of the shafts 102.

Each of the units 107 is provided with a drive shaft 135 which is extended entirely through the housing 109 and the connector 110. The drive shaft 135 extends above the driven shafts 102 and at right angles thereto. The drive shaft 135 is supported at its opposite ends by bearings 136, through which the shaft 135 extends, which bearings are supported by bushings 137 which are secured in openings 138 provided at the outer parts of the housings 109 by suitable screws 139.

Secured on the drive shaft 135 directly above each of the driven shafts 102 are drive gears 141, these drive gears being secured to the drive shaft 135 by pins 142. The drive gears 141 mesh with and are adapted to drive driven gears 143 which are rotatably carried on the drive shafts 102. Placed on the drive shafts 102 for engaging outer faces of the drive gears 143 are washers 144. Adjacent to the washers 144 are clutch elements 145 which are locked against rotation relative to the driven shaft 102 by pins 146 carried by the shafts 102, which pins 146 extend into axial slots 147 of the clutch elements 145. This pin and slot arrangement however permits each of the clutch elements 145 to move axially on the shafts 102. Placed between the clutch elements 145 and the bearings 119 are springs 149 having openings 150 therethrough, through which the shafts 102 extend. These springs 149 have projections 151 which engage the clutch elements 145. The bearings 119 are engaged by adjuster covers 152 which are threadably secured in openings 154 of each of the bushings 129, as indicated at 153. By advancing the adjuster covers 152 into the bushings 129, the bearings 119 are moved inwardly, forcing against the springs 149 and causing these springs to exert a greater pressure against the clutch elements 145. The driven gears 143 are arranged to drive the driven shafts 102 through engagements between the gears 143, the washers 144 and the clutch elements 145. The adjuster covers 152 may be locked in a desired position by set screws 156.

Placed below each of the upper spool shafts 88, as shown in Figs. 3, 4, 6 and 13, are lower spool shafts 160, there being two lower spool shafts for each film handling unit 55. The opposite ends of the shafts 160 are provided with journal portions 161 which extend into bearings 162. These bearings 162 are secured to vertically extending bearing supporting bars 164 by bolts 165. These bearing supporting bars 164 are secured to the side plates 67 by bolts 166. The lower shafts 160 are wrapped with a friction tape 167 as shown best in Fig. 13. Lower spools 168 are carried on the lower shafts 160. These spools 168 are of the same character as the upper spools 91, consisting of film engaging portions 169, central reduced portions 170 and outer flanges 171. The spools 168 have openings 173 through which the lower shafts 160 extend, these openings being of such a size that the spools 168 are loosely carried thereon. Extending below the shafts 160 are bars 174, these bars 174 being secured by bolts 175 to the lower ends of the bearing supporting bars 164. The bars 174 have upwardly extending pins 177 which extend between and to each side of the lower spools 168 for spacing them in proper positions on the lower shafts 167. Also extending upwardly from the bars 174 are extensions 178 which are positioned directly below the film engaging portions 169 of each of the spools 168. The upper ends of these extensions 178 terminate a very short distance below the lower parts of the film engaging portions 169.

Mounted between each pair of upper and lower shafts 88 and 160 are indicating arrangements which are best shown in Figs. 3, 6 and 14. As shown in these figures, arms 180 are pivoted by bolts 181 to the side plates 67 of each of the film handling units 55. Extending inwardly from the free ends of the arms 180 are shafts 182 which rotatably carry tension indicating spools 183. These arms 180 are pivoted at opposite plates 67 of each of the units 55 and extend in opposite directions so that the tension indicating spool 183 carried by one of these arms is disposed between one pair of upper and lower shafts of the unit, and so that the tension indicating spool carried by the other of the arms 180 is disposed between the other pair of upper and lower shafts of the unit. The arrangement of the upper and lower spools and indicating spools is best shown in Fig. 4.

It should be noted that the upper shafts 88 carry seven upper spools 91 and the lower shafts 160 carry five lower spools 168. The film is wound in loops around the upper and lower spools and is extended around the tension indicating spools 183, the film always leaving the pair of spools from an upper end spool. In Fig. 4 we show but one unit 55. It is understood, of course, that this view is very diagrammatic and is only for the purpose of illustrating the manner in which the film is wrapped around the spools. Extending from the arms 180 are members 184 which carry extensions 185. These extensions 185 extend to a point directly below the film engaging portions of the indicating spools and hold the film in place when the film is slack. The arms 180 have extensions 186 which may swing between lower stops 187 and upper stops 188 which extend from the side plates 67. The indicating spools 183 of the left unit shown in Fig. 3 are in lowermost position, the extension 186 engaging the stop 187, and are shown in uppermost position in the second unit of Fig. 3, the extension in this unit engaging the upper stop 188.

Tellers 190 are attached at 191 to the arms 180, these tellers extending diagonally to opposite corners of each of the units 55 whereat they are extended upwardly so that upper ends 193 thereof project from the tops of each of the units and are visible to the eye. The tellers 190 provide a means whereby the positions of the tension indicating spools, to which it is connected, may be discerned.

Each of the units 55 is adapted to be driven by the wet box drive shaft 48. As shown in Figs. 12 and 15, collars 195 are rigidly secured on the ends of the drive shafts 135 of each of the gear mechanism units 107. These collars 195 have diametrally extending lugs 196. Extending between adjacent units and between an end unit and the wet box drive shaft 48 are couplings 198. The couplings 198 each consists of a body 199 having diametral slots 200 formed at each end which are adapted to receive the lugs 196. Surrounding the bodies 199 are tubular sleeves or housings 203 which have diametrically opposite slots 204 cut in the opposite ends thereof which are of a size equaling with the cross section of the slots 200. A circumferential slot 206 is provided in each of the housings 203 through which a screw 207 carried by the body 199 is extended. The slot and screw arrangements 206 and 207 permit the sleeve to be rotated on the body within certain limits.

As shown best in Figs. 12 and 15, the housing 203 of the illustrated coupling 198 is positioned on the body 199 so that the slots 204 thereof are out of registry with the slots 200. The lugs 196 of adjacent units are shown resting in the slots 200. The ends of the adjacent shafts are arranged so that there can be no axial movement of the coupling 198; and the housing 203, since the slots 204 thereof are out of registry with the slots 200, prevents the coupling from being moved sidewardly from place. When it is desired to disconnect a portion of the shaft or remove one of the units, the housings of adjacent couplings are positioned so that the slots 204 thereof are in registry with the slots 200. The couplings 198 may then be moved radially or sidewardly from place, and the desired unit is thus disconnected from the system.

As shown in Figs. 1, 2, 3, 4 and 5, film which has been exposed is carried on a feed reel 215 which is supported by a bracket 216 at the intake end of the developing apparatus. The film 94 passes from the feed reel 115 around a feed sprocket 217. The feed sprocket 217 is carried on a shaft 218 which is connected to and driven by a gear mechanism unit 220 which is equivalent to one-half of the gear mechanism units 107 having but one clutch. The unit 220 is connected to an adjacent unit 107 by a coupling 221 which is similar to the couplings 198. The film 94 passes around a roller 223 and a roller 224 which are suitably supported, these rollers being placed in front of and in back of the sprocket 217. The film is then extended to a slack take-up arrangement having a spool 226 which is supported by a bracket 227, this bracket 227 being secured to framework of the wet box. The film passes over the spool 226 and over a traveling spool 228 which is rotatably carried by a bracket 229. This bracket 229 is attached to the end of a cord 230 which extends over sheaves 231 which are supported at the upper end of an arm 232. This arm 232 is also supported by framework of the dry box. A weight 235 is secured to the extending end of the cord 230 and tends to hold the traveling spool 228 in an uppermost position. The film 94 passes from the spool 228 over a spool 239 which is supported by a bracket 240. The film passes from the spool 239 to a first upper spool of the first and adjacent unit 55. The slack take-up is provided at this point so that in event the first unit does not take the film as fast as it is fed by the feed sprocket 217, there will be no slack and no tangling of the film thereat.

The film 94 passes from the last wet box unit 55 over a medial drive sprocket 250, the film being guided thereover by rollers 251 supported by a suitable bracket 252. This medial roller 250 is carried by a shaft 253 which extends from a gear mechanism unit 254, which is operated by the vertical shaft 46. This is clearly shown in Figs. 1 and 2. The film then passes over a roller 256 and into the dry box 31.

With reference particularly to Figs. 16 to 19 of the drawings, the dry box has dry box film handling units 258. These units 258 are substantially the same as the wet box film handling units 55 except that they are permanently mounted in the dry box 37.

In the compartment 37 of the dry box unit 31 is a frame having upper longitudinal bars 260, lower longitudinal bars 261 and vertical bars 262. The bearing cages 75 of the dry box units are formed so that they may be secured directly to the upper longitudinal bars 260 by suitable bolts 264. The clutch mechanism units 107 of the dry box film handling units are substantially the same as the wet box units except that they are provided with formations 265 so that they may be secured to the upper longitudinal bars 260 by bolts 266. The dry box gear mechanism units being thus rigidly secured in place are not provided with the interconnecting couplings 198 but are connected together by shafts 270 which extend through tubes 271. The upper and lower shafts 88 and 160 are the same and the upper and lower spools 91 and 168 are the same. The lower shafts 160 in the dry box are rotatably supported by bearings 162, which bearings 162 have lugs 274 which permit them to be secured to the lower longitudinal bars 261 by bolts 275.

In the dry box the tension indicating spools are mounted differently. Extending upwardly from the lower longitudinal bars 261 are pairs of slide rods 278 on which brackets 279 are slidable. Extending from the brackets 279 are shafts 280 which support the tension indicating spools 281 of the dry box. The upper ends of the slide bars 278 are provided with stops in the form of nuts 283, and springs 284 are placed between these stops 283 and the brackets 279.

As in the case of the wet box units there is one indicating spool for each pair of upper and lower spools. The film is wound over the upper and lower spools in the same manner as they are wound over the spools in the wet box units 55 and as shown clearly in Fig. 4. The film passes from one dry box film handling unit 258 to the next dry box film handling unit. The film 94 is then passed through a mangle which consists of a drive roller 286 which is secured to a shaft 287. The shaft 287 is supported at one end by a bearing 288 and at the other end by a clutch mechanism unit 289 which is of the same construction as the other clutch mechanism units of the invention. The film is held in contact with the drive roller 286 by a roller 290 carried at the free end of an arm 291 which is pivoted at 292. A weight 294 is hung from the arm 291 by a cord 296 for pressurably applying the roller 290 against the film and holding it in firm contact with the drive roller 286, so that it cannot frictionally slip thereon. The clutch mechanism unit 289 is connected to the shaft 270 and is thus driven with the other clutch mechanism units of the invention. The film passes from the mangle between exhaust rollers 299 and 300 which are supported by a bracket 301 and then passes to a re-wind reel 302.

As shown best in Figs. 16 and 18, the re-wind reel is carried on a shaft 304 which extends from a clutch mechanism unit 305, this clutch mechanism unit 305 being supported by a bracket 306, and being connected to the shaft 270 through bevel gear units 308 and 309 and shafts 310 which extend between the bevel gear units and the unit 305. This clutch mechanism unit 305 operates in the same manner as the other clutch mechanism units of the invention. The re-wind reel is supplied merely to take care of the film fed from the machine and is not relied on as a tension regulating device in any way.

Placed between the wet box 30 and the dry box 31 is a central re-wind reel 315 which is carried on a shaft 316. This shaft 316 extends from and is operated by a clutch mechanism unit 317 which is of the same construction as the other clutch mechanism units of this invention, being driven from the shaft 46 by a shaft 318.

The operation of the developing apparatus of our invention is substantially as follows:

The units 55 of the wet box are elevated by a suitable crane from the solution tanks so that access to the various spools may be had. A leader strip is then wound around the spools of these units, after which they are lowered into the solution tanks again. The leader strip is also wound around the units 258 of the dry box extended between the mangle rollers and is started on the re-wind reel 302. The film 94 which has previously been exposed is carried on the feed reel 215 and the end thereof is extended around the drive sprocket 217 and the slack take-up arrangement and is connected to the leader film. The coupling being in place, the apparatus is then set into operation by means of the drive motor 42 which drives the shafts 48 and 51 of the wet and dry boxes by means of the quick-change gear box 45.

All of the clutch mechanism units are of the same gear ratio except the first clutch mechanism unit 220 which operates the feed sprocket 217. The gear ratio in this unit is such that the feed sprocket 217 is driven slightly slower than the upper shafts 88, the medial drive sprocket 250, the mangle roller 286 and the re-wind reel 302. The film in passing over the spools of the various units has sufficient adhesion to prevent any slippage therebetween under ordinary operating conditions, and there is sufficient adhesion between the upper and lower spools and the upper and lower shafts to prevent any slipping action therebetween under ordinary operating conditions. For this reason there will be a slight slippage between the clutch elements 145 and the driven gears 143 when the film is at normal tension.

With reference to Fig. 3, the central unit 55 shows the position of the tension indicating spools 183 thereof when the film is at normal tension. It will be seen that the projection 186 is positioned adjacent to the upper stop 188. As previously mentioned, the film while in the wet box stretches. The clutches, however, of the units 55 are set at proper tension so that the film will be carried therethrough at a rate of speed which tends to maintain the indicating spools in upper position. When the film stretches to an appreciable extent, the indicating spools may momentarily lower from their upper and normal position. However, when this occurs, the film reduces in tension and the resistance to rotation placed on the upper shafts is reduced. At this time there will be less slippage of the clutch units, and the upper shafts will be rotated at a higher rate of speed, thus returning the film to normal tension and also returning the indicating spool to normal position. The tellers 190 merely indicate to the operator the positions of the indicating spools of each of the units, the upper ends 193 of these tellers extending above the tanks and being plainly observed. In practice it is found that the indicating spool of one set of upper and lower spools effects the operation of a following set of spools; that is to say, when the indicating spool of one set of spools drops below normal position there is less slippage in the clutch of the following set of spools, this rotating the following spools faster and quickly taking up the extra slack in the preceding spools and thus returning the preceding indicating spool to normal position. The film passes through the developing solution tank and fixative solution tank, the washing solution tank, and passes through other tanks of the wet box and is then extended to the dry box.

The film in passing to the dry box must pass over the medial drive sprocket 250. The film 94 passes around the upper and lower spools in the dry box and around the indicating spools 281 thereof, as previously described. The normal position of the spools 281 in the dry box 31 is shown in Figs. 16 and 17, the brackets 279 being held in engagement with the springs 284.

As previously mentioned, in the dry box the film is dried and shrinks to substantially normal condition. The clutches of the units in the dry box are slipping slightly in the same manner as in the wet box units without any slippage between the film and the spool or the spool and its shaft. As the film shrinks, the tension thereof is slightly increased and the indicating spools 281 are moved upwardly against the action of the springs 284. For example, when the tension in the first set of spools increases, the first indicating spool 281 is raised. This increase in tension places more of an opposition to the rotation of the upper shaft of a following set of spools and there is at this time a greater slippage of the clutch of the following unit. Therefore, the film is taken from the first set of spools at a lower rate of speed. This allows the tension in the film to reduce and the indicating spool will return to normal position. An increase in tension in one set of spools will effect the operation of the following sets of spools until the condition of the film returns to normal.

As the film passes from the upper spool of the last unit, it is completely dried and there will be no more shrinkage thereof. There is at this time a tendency for the film to curl, and it is therefore passed between the mangle rollers 286 and 290 which prevents curling thereof. The film then passes between the exhaust rollers 299 and 301 and is then wound on the re-wind reel 302.

All of the clutch mechanism units of our invention may be adjusted while the machine is in operation whenever the position of the indicating spools shows that this is necessary. As shown in Fig. 7, the friction of engagement between the driven gear 143 and the clutch element 145 of each of the units may be adjusted by a rotation of the adjuster cap 152 which positions the bearing as desired. This adjuster cap 152 of any of the units may be rotated and therefore any of the clutches may be adjusted while the apparatus is in operation. In actual practice, however, it is found that when the clutches are once adjusted it is very seldom that they need to be readjusted.

In the event there should be a breakage in the dry box or the dry box should become inoperative, the film may be taken directly from the wet box 30 and rewound on the central re-wind reel 315. In this case the film 94 is extended from the medial drive sprocket 250 to the central re-wind reel 315, as indicated by dotted lines 360. The film is still wet at this time but may however be wound on the central re-wind reel 315 and may subsequently be passed through the dry box.

We claim as our invention:

1. In a film handling apparatus, the combination of: a plurality of treating tanks; film handling mechanisms, one of which is disposed in each of said tanks; a drive shaft on each of said mechanisms, said mechanisms being disposed in spaced relation with each other, each being separately removable from its tank; and quickly removable connecting shafts for connecting said mechanism shafts.

2. In a film handling apparatus, the combination of: a plurality of treating tanks; film handling mechanisms, one of which is disposed in each of said tanks; a drive shaft on each of said mechanisms, said mechanisms being disposed in spaced relation with each other, each being separately removable from its tank; quickly removable connecting shafts for connecting said mechanism shafts; and manually operable locking means for locking said connecting shafts in connecting position.

3. In a film handling apparatus, the combination of: a plurality of treating tanks; film handling mechanisms, one of which is disposed in each of said tanks; a drive shaft on each of said mechanisms, said mechanisms being disposed in spaced relation with each other, each being separately removable from its tank; quickly removable connecting shafts for connecting said mechanism shafts; and manually operable locking sleeves for locking said connecting shafts in connecting position.

4. In a film handling apparatus, the combination of: primary and secondary shafts; a plurality of drive spools mounted upon said primary shaft and adapted to be driven thereby; a plurality of driven spools mounted upon said secondary shaft and adapted to rotate freely thereon, a film being adapted to be wound about said drive spools and said driven spools whereby said driven spools are rotated; and a driven spool and film guide having fingers projecting between said driven spools for spacing these, and fingers projecting close to said film as it passes around said driven spools.

5. In a film handling apparatus, the combination of: a plurality of film handling mechanisms, each mechanism including drive and driven shafts, and spools rotatably mounted on said shafts, a film being windable about said spools so as to be fed in a given direction when said drive shafts are rotated; a main drive shaft; primary bearings for said drive shafts; drive gears fixed on said main drive shaft; a driven gear rotatable on each drive shaft and meshing with a drive gear; clutch elements, one being shiftably and nonrotatably mounted on each of said drive shafts; secondary bearings in each of which an end portion of one of said drive shafts journals; yieldable elements, one of which is disposed about one of said drive shafts between the clutch element and secondary bearing thereof; and means for shifting each of said secondary bearings toward a corresponding primary bearing to compress a yieldable member and set up a variable friction between a clutch element and driven gear.

6. In a film handling apparatus, the combination of: a frame; drive shaft bearings; means for mounting said bearings upon said frame, said means permitting one of said bearings to be quickly movable upon said frame; a drive shaft; drive rollers on said drive shaft; driven rollers, a film being adapted to be wound around said drive and driven rollers; and means connecting said drive shaft to said bearings, said means permitting said shaft to be readily disconnected from said bearings.

7. In a film handling apparatus, the combination of: a plurality of upper spools; an upper shaft for supporting said upper spools, said upper spools being loosely carried by said upper shaft; a plurality of lower spools; a lower shaft on which said lower spools are loosely carried; a clutch mechanism through which said upper shaft is driven, there being sufficient friction between said upper spools and said upper shaft to drive said upper spools, said clutch mechanism slipping when film in said apparatus is at or near normal tension; a film feeding means; and a slack take-up device situated between said feed means and said upper and lower spools.

8. In a film handling apparatus, the combination of: a plurality of upper spools; an upper shaft for supporting said upper spools, said upper spools being loosely carried by said upper shaft; a plurality of lower spools; a lower shaft on which said lower spools are loosely carried; a clutch mechanism through which said upper shaft is driven, there being sufficient friction between said upper spools and said upper shaft to drive said upper spools, said clutch mechanism slipping when film in said apparatus is at or near normal tension; a film feeding means; a slack take-up device situated between said feed means and said upper and lower spools; and a compensating spool over which said film passes, said compensating spool operating to take up any slack in said film so that said film will be kept in contact with said upper and lower spools.

9. In a film handling apparatus, the combination of: a plurality of upper spools; an upper shaft for supporting said upper spools, said upper spools being loosely carried by said upper shaft; a plurality of lower spools; a lower shaft on which said lower spools are loosely carried; a clutch mechanism through which said upper shaft is driven, there being sufficient friction between said upper spools and said upper shaft to drive said upper spools; a feeding means for feeding film to said upper and lower spools at such a speed that said clutch mechanism will slip when said film is at or near normal tension; and a slack take-up device situated between said feed means and said upper and lower spools.

10. In a film handling apparatus, the combination of: a plurality of upper spools; an upper shaft for supporting said upper spools, said upper spools being loosely carried by said upper shaft; a plurality of lower spools; a lower shaft on which said lower spools are loosely carried; a clutch mechanism through which said upper shaft is driven, there being sufficient friction between said upper spools and said upper shaft to drive said upper spools, said clutch mechanism slipping when film in said apparatus is at or near normal tension; a compensating spool over which said film passes, said compensating spool operating to take up any slack in said film so that said film will be kept in contact with said upper and lower spools; a re-wind reel; and a clutch mechanism for driving said re-wind reel, there being a slippage thereof when said film is at or near normal tension.

11. A film treating apparatus comprising: frictionally driven spools adapted to move film through the apparatus; and a driven retarding member adapted to hold back on the film travelling over the said driven spools.

12. A film treating apparatus comprising: frictionally driven spools adapted to move film through the apparatus; and a driven retarding sprocket adapted to normally rotate at a slower speed than said spools to hold back on the film travelling over said spools.

13. A film treating apparatus comprising: a plurality of receptacles; a series of spools associated with said receptacles, some of said spools being driven; and a retarding member frictionally driven at a normal rate of speed less than the speed of the said driven spools.

In testimony whereof, we have hereunto set our hands at Los Angeles, California, this 9 day of Dec., 1925.
JOSEPH L. ALLER.
PERCY HIGGINSON.